United States Patent
Fellhauer et al.

(10) Patent No.: US 11,888,937 B2
(45) Date of Patent: Jan. 30, 2024

(54) DOMAIN SPECIFIC PROVIDER CONTRACTS FOR CORE DATA SERVICES

(71) Applicant: SAP SE, Walldorf (DE)

(72) Inventors: Fabian Fellhauer, Östringen (DE); Thomas Henn, Stutensee/Friedrichstal (DE); Matthias Herchenroether, Heidelberg (DE); Fee Grauf, Spechbach (DE); Boyan Boychev, Karlsruhe (DE); Kolja Gross, Karlsruhe (DE); Timm Falter, Sinsheim-Hilsbach (DE); Mike Hirsch, Neulussheim (DE); Victoria Kosten, Heidelberg (DE); Matthias Becker, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/712,338

(22) Filed: Apr. 4, 2022

(65) Prior Publication Data
US 2023/0319137 A1 Oct. 5, 2023

(51) Int. Cl.
*H04L 67/1097* (2022.01)
*H04L 67/53* (2022.01)
*G06F 16/27* (2019.01)

(52) U.S. Cl.
CPC .......... *H04L 67/1097* (2013.01); *G06F 16/27* (2019.01); *H04L 67/53* (2022.05)

(58) Field of Classification Search
CPC ...... H04L 67/1097; H04L 67/53; G06F 16/27
See application file for complete search history.

(56) References Cited

U.S. PATENT DOCUMENTS

| 2015/0074081 A1* | 3/2015 | Falter | G06F 16/2433 |
| | | | 707/713 |
| 2015/0074083 A1* | 3/2015 | Hutzel | G06F 16/2445 |
| | | | 707/716 |
| 2015/0074136 A1* | 3/2015 | Falter | G06F 16/288 |
| | | | 707/760 |

(Continued)

FOREIGN PATENT DOCUMENTS

| EP | 3035212 A1 * | 6/2016 | G06F 16/182 |
| WO | WO-2022090767 A1 * | 5/2022 | |

*Primary Examiner* — Shean Tokuta
(74) *Attorney, Agent, or Firm* — Buckley, Maschoff & Talwalkar LLC

(57) ABSTRACT

An enterprise database server may store enterprise information. An application layer server, coupled to the enterprise database server, may use an application programming language (e.g., ABAP) to access the enterprise information. The application layer server may execute a plurality of domain runtimes, each associated with a domain service (e.g., transactional, SQL, analytical, search, etc.). The application layer server may also access, by a first domain runtime, a first data service entity in an infrastructure for data modelling (e.g., CDS) that enables data models to be defined and consumed on the enterprise database server. Similarly, the application layer server may access, by a second domain runtime, a second data service entity in the infrastructure for data modelling. According to some embodiments, the first data service entity includes a first provider contract and the second data service entity includes a second provider contract (different than the first provider contract).

10 Claims, 9 Drawing Sheets

(56) References Cited

U.S. PATENT DOCUMENTS

| | | | |
|---|---|---|---|
| 2015/0074139 A1* | 3/2015 | Falter | G06F 16/2456 |
| | | | 707/769 |
| 2015/0074140 A1* | 3/2015 | Hutzel | G06F 16/90335 |
| | | | 707/769 |
| 2015/0293947 A1* | 10/2015 | Bhagavan | G06F 16/212 |
| | | | 707/802 |
| 2016/0085659 A1* | 3/2016 | Schmitt | G06F 11/3616 |
| | | | 717/126 |
| 2016/0171020 A1* | 6/2016 | Stork | G06F 16/212 |
| | | | 707/803 |
| 2018/0210902 A1* | 7/2018 | Wu | G06F 16/212 |
| 2021/0209501 A1* | 7/2021 | Sarferaz | G06F 9/547 |
| 2022/0058517 A1* | 2/2022 | Cherry | G06N 20/00 |

\* cited by examiner

DOMAIN SPECIFIC PROVIDER CONTRACTS FOR CORE DATA SERVICES

BACKGROUND

An enterprise may utilize applications or services executing in a cloud-based computing environment. For example, a business might utilize applications that access a database at a data center to process purchase orders, human resources tasks, payroll functions, etc. The computing environment may include an enterprise database server (e.g., associated with SAP HANA® in-memory, column-oriented, relational database management system) and an application layer server, such as an Advanced Business Application Programming ("ABAP") programming language server for the mass-processing of data in business applications. Note that today's infrastructure of an ABAP server may contain multiple runtimes that can be used for modifying, reading, and processing data. For example, there might be a runtime for transactional services, a runtime for analytical services, and a runtime for search services.

These runtimes may make use of a unified Core Data Service ("CDS") model in a corresponding ABAP based application. In this way, there may be one language to model the structure of entities and the dependencies between them. For example, FIG. 1 is a high-level block diagram of a system 100 associated with a cloud-based computing system. The system 100 includes a high-level programming language server 150 that exchanges information with an enterprise database server 190.

The high-level programming language server 150 may include a transactional service 110 and transactional service runtime 112 that accesses a CDS entity 114 in a CDS infrastructure 160. Similarly, the high-level programming language server 150 may include: an SQL service 120 and SQL service runtime 122 that accesses a CDS entity 124; an analytical service 130 and analytical service runtime 132 that accesses a CDS entity 134; and a search service 140 and search service runtime 142 that accesses a CDS entity 144. The different runtimes 112, 122, 132, 142 may support different features. An ABAP dictionary may ensure that in the CDS design time model, only those features which are supported by the intended consumption scenario can be used. For example, if a CDS entity 114 is modelled for transactional services 110 then arithmetic operations are not supported in specific layers of such a business object. Currently, runtime specific checks during compile time are not possible in the CDS infrastructure 160. Therefore, successful compilation of a runtime specific CDS artifacts cannot be prevented. This may result in runtime errors during test execution in follow-up systems and cause a time and cost intensive iterative development process (altering between development and test systems).

It would therefore be desirable to provide CDS entity modeling for a particular runtime associated with a cloud-based computing environment application layer server in an efficient and accurate manner.

SUMMARY

Methods and systems may be associated with a cloud-based computing environment. An enterprise database server may store enterprise information. An application layer server, coupled to the enterprise database server, may use an application programming language (e.g., ABAP) to access the enterprise information. The application layer server may execute a plurality of domain runtimes, each associated with a domain service (e.g., transactional, SQL, analytical, search, etc.). The application layer server may also access, by a first domain runtime, a first data service entity in an infrastructure for data modelling (e.g., CDS) that enables data models to be defined and consumed on the enterprise database server. Similarly, the application layer server may access, by a second domain runtime, a second data service entity in the infrastructure for data modelling. According to some embodiments, the first data service entity includes a first provider contract and the second data service entity includes a second provider contract (different than the first provider contract).

Some embodiments comprise: means for executing, by at least one computer processor of an application layer server that uses an application programming language to access enterprise information, a plurality of domain runtimes, each associated with a domain service; means for accessing, by a first domain runtime, a first data service entity in an infrastructure for data modelling that enables data models to be defined and consumed on an enterprise database server rather than the application layer server, wherein the enterprise database server stores the enterprise information; and means for accessing, by a second domain runtime, a second data service entity in the infrastructure for data modelling, wherein the first data service entity includes a first provider contract and the second data service entity includes a second provider contract different than the first provider contract.

Some technical advantages of some embodiments disclosed herein are improved systems and methods to provide CDS entity modeling for a particular runtime associated with a cloud-based computing environment application layer server in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
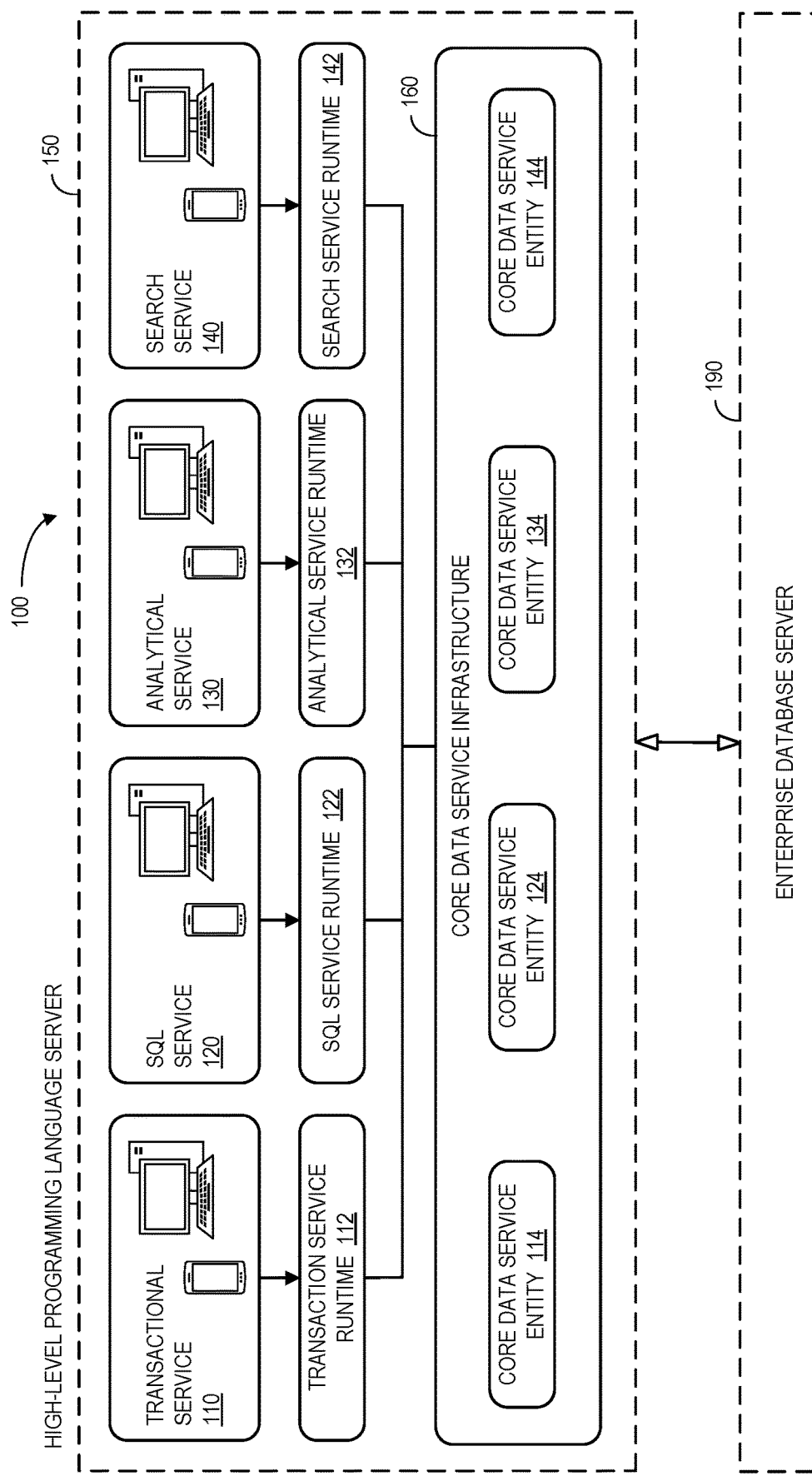
FIG. 1 is a high-level block diagram of a system associated with a cloud-based computing system.
Figure 2:
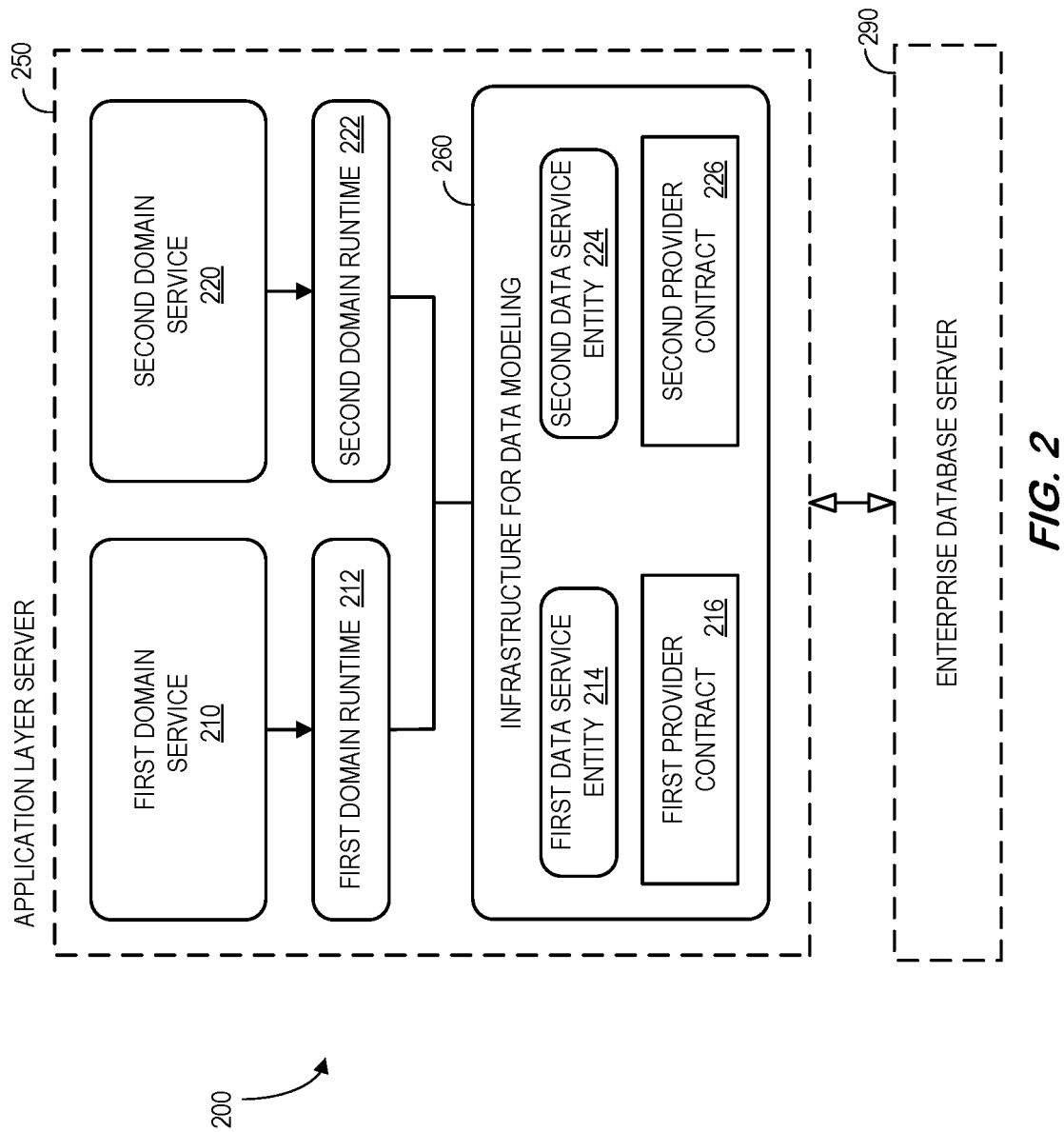
FIG. 2 is a high-level system architecture according to some embodiments.

To provide improved CDS entity modeling for a particular runtime associated with a cloud-based computing environment application layer server in an efficient and accurate manner, FIG. 2 is a high-level system 200 architecture in accordance with some embodiments. The system 200 includes an application layer server 250 that exchanges information with an enterprise database server 290. The high-level programming language server 250 may include a first domain service 210 and first domain runtime 212 that accesses a first data service entity 214 in an infrastructure for data modeling 260. Similarly, the application layer server 250 may include: a second domain service 220 and second domain runtime 212 that accesses a second data service entity 224. The different domain runtimes 212, 222 may support different features. According to some embodiments, the first data service entity 214 is associated with a first provider contact 216 and the second data service entity 224 is associated with a second provider contact 226 (different than the first provider contact 216).

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The application layer server 250 may store information into and/or retrieve information from various data stores, which may be locally stored or reside remote from the application layer server 250. Although a single application layer server 250 is shown in FIG. 2, any number of such devices may be included. Moreover, various devices described herein might be combined according to embodiments of the present invention. The system 200 functions may be performed by a constellation of networked apparatuses, such as in a distributed processing or cloud-based architecture.

An operator or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various mappings) and/or provide or receive automatically generated recommendations or results from the system 200.

Note that a data model may represent a framework that organizes elements of data and standardizes how they relate to one another in a database. Data models may provide a standardized method for defining and formatting database contents consistently across systems, enabling different applications to share the same data. Professional data modeling tools provide a way to generate SQL from a modeled entity relationship diagram.

Some data models are defined and consumed in the database layer rather than in the application layer (or server 250). One such example is SAP CDS, which is a data modeling infrastructure that provides a Data Definition Language ("DDL") for defining semantically rich database tables/views (CDS views) and user-defined types in the database. CDS provides support for conceptual modeling and relationship definitions, built-in functions, and extensions.

Data models may be defined as views (e.g., CDS views), which can be used in applications (e.g., Fiori applications) to enable access to the database. Data model views may be created as design-time files and natively integrated into the database layer to take advantage of in-memory database computing (e.g., SAP HANA®) to achieve good performance for high data volume. However, the database layer may be unable to handle customized complex calculations. Such customized calculations are typically programmed within the application using an application programming language (e.g., SAP ABAP). Application logic (e.g., data reading, processing, output), programmed using such application programming language, is suitable for processing small to medium data volumes and customized complex calculations. The application is typically executed within an application layer (e.g., SAP NETWEAVER®), while the data model view is run within the database layer (e.g., SAP HANA®). Therefore, application logic may be inserted before or after the execution of the data model (e.g., CDS view).

Figure 3:
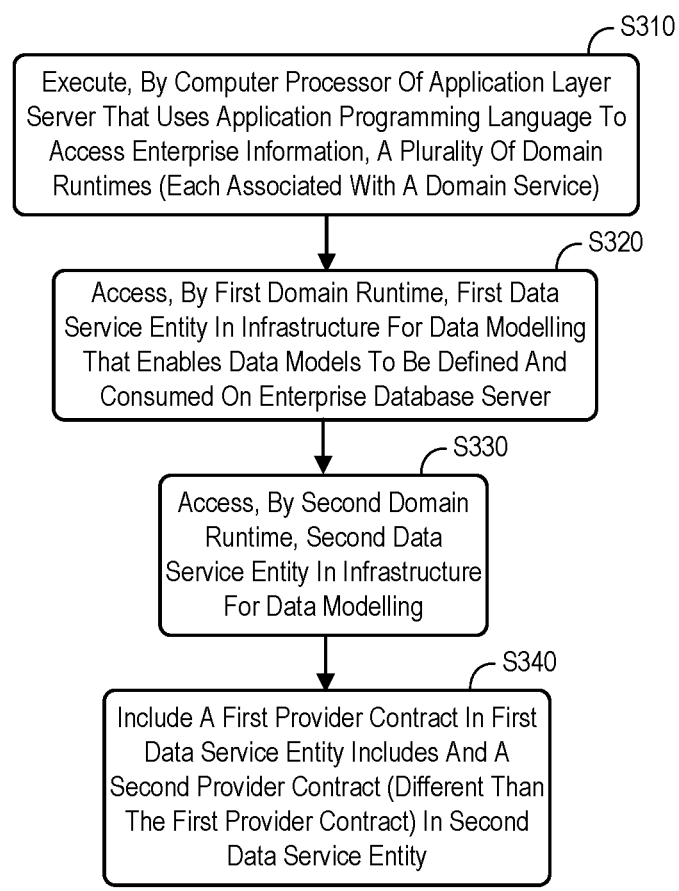
FIG. 3 is a method in accordance with some embodiments.

FIG. 3 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, at least one computer processor of an application layer server (e.g., that uses an application programming language such as ABAP to access enterprise information) may execute a plurality of domain runtimes, each associated with a domain service (e.g., a transactional service, an SQL service, an analytical service, a search service, etc.). At S320, a first domain runtime may access a first data service entity in an infrastructure for data modelling. The infrastructure for data modelling may, for example, enable data models to be defined and consumed on an enterprise database server rather than the application layer server (e.g., a CDS infrastructure). Moreover, the enterprise database server may store the enterprise information. At S330, a second domain runtime may access a second data service entity in the infrastructure for data modelling. According to some embodiment, the first data service entity includes a first provider contract and the second data service entity includes a second provider contract (different than the first provider contract).

Figure 4:
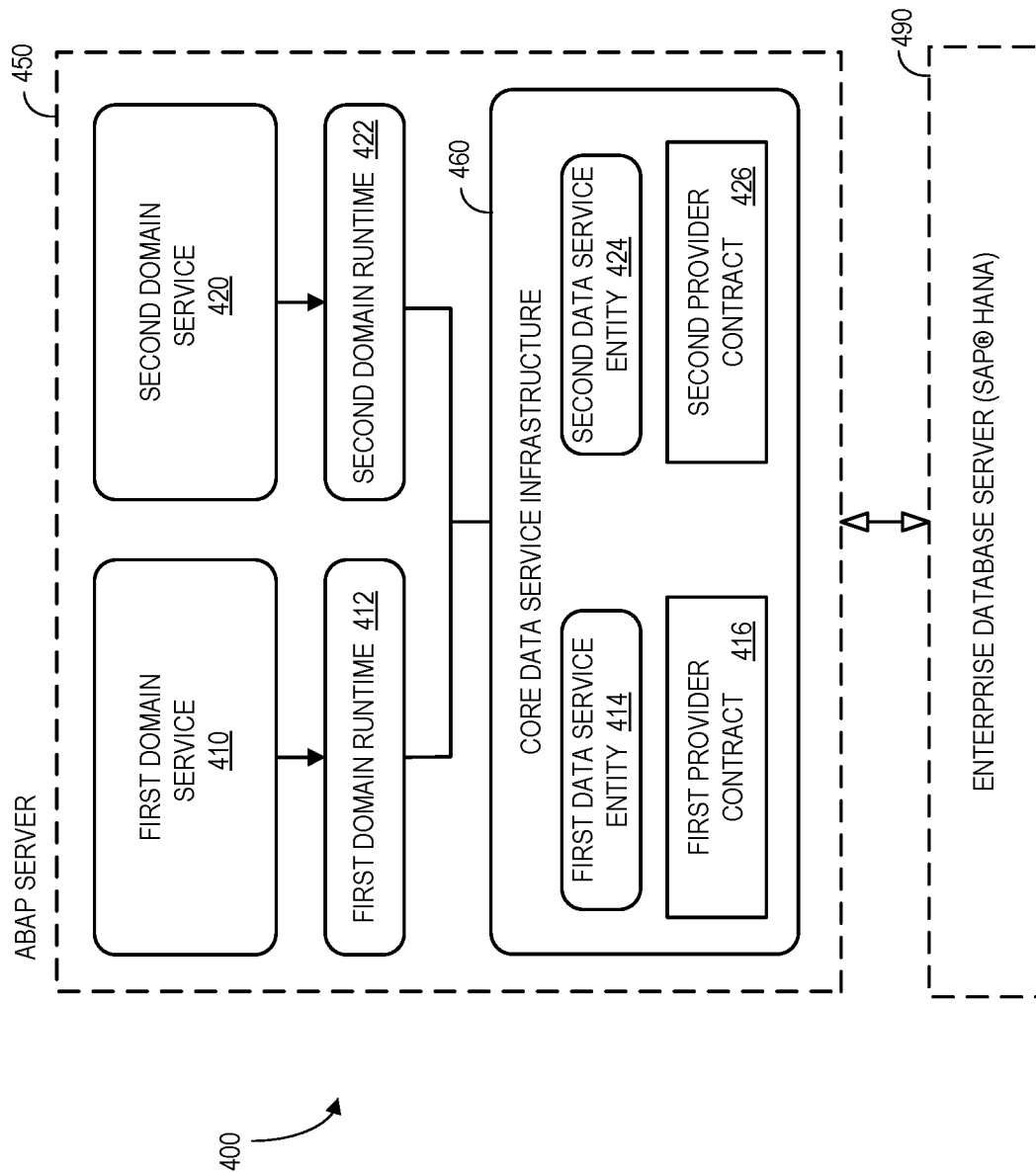
FIG. 4 is a more detailed high-level system architecture according to some embodiments.

FIG. 4 is a more detailed high-level system 400 architecture according to some embodiments. The system 400 includes an ABAP server 450 that exchanges information with a HANA enterprise database server 490. The ABAP server 450 may include a first domain service 410 and first domain runtime 412 that accesses a first data service entity 414 in a CDS infrastructure 460. Similarly, the ABAP server 450 may include: a second domain service 420 and second domain runtime 422 that accesses a second data service entity 424. According to some embodiments, the first data service entity 414 is associated with a first provider contact 416 and the second data service entity 424 is associated with a second provider contact 426 (different than the first provider contact 416).

Figure 5:
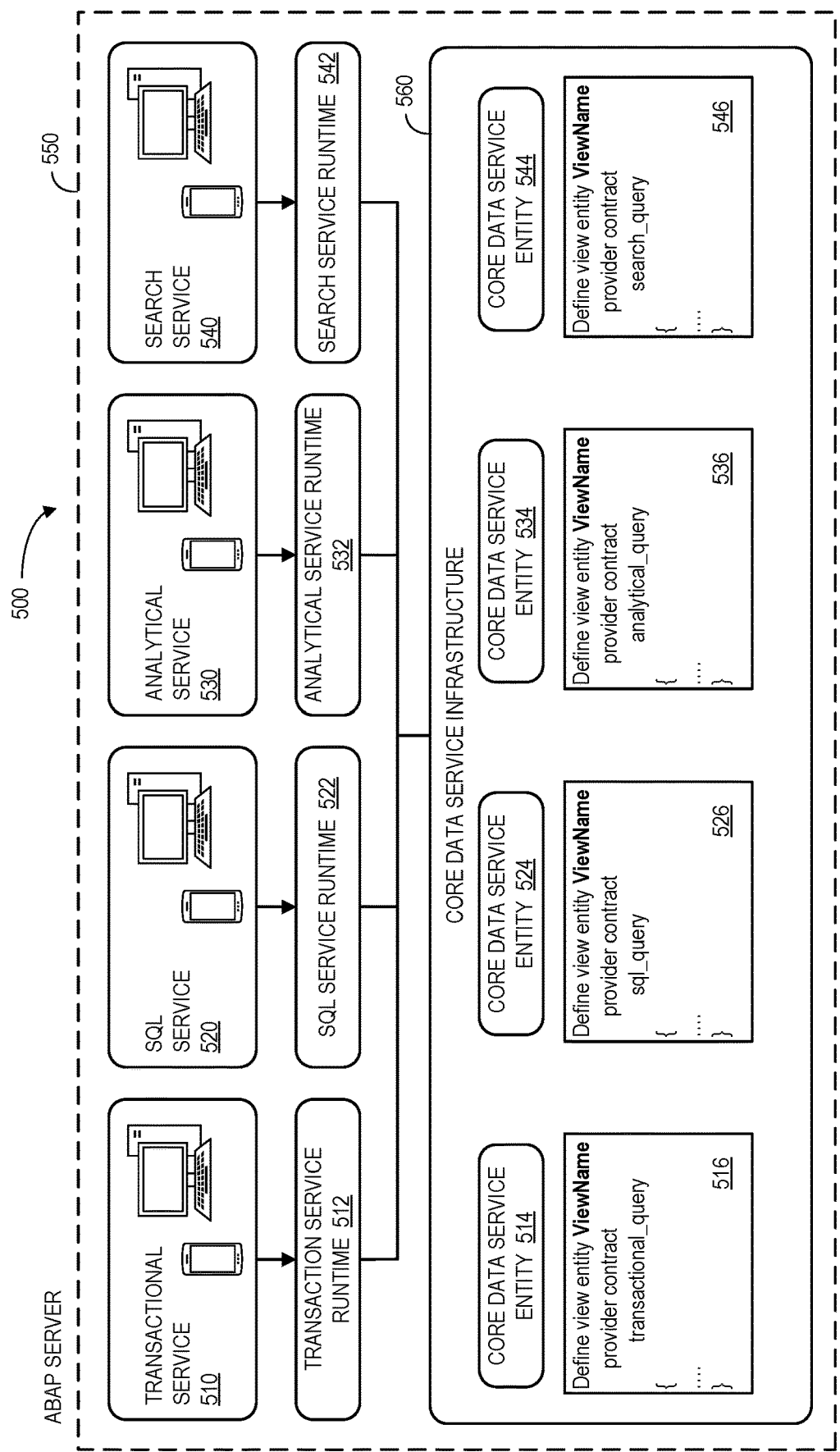
FIG. 5 is an example of a system in accordance with some embodiments.

FIG. 5 is an example of a system 500 in accordance with some embodiments. As before the system 500 includes an ABAP server 550 that exchanges information with a HANA enterprise database server (not shown in FIG. 5). The ABAP server 550 may include a transactional service 510 and transactional service runtime 512 that accesses a CDS entity 514 in a CDS infrastructure 560. Similarly, the ABAP server 550 may include: an SQL service 520 and SQL service runtime 522 that accesses a CDS entity 524; an analytical service 530 and analytical service runtime 532 that accesses a CDS entity 534; and a search service 540 and search service runtime 542 that accesses a CDS entity 544.

The CDS entity 514 in the CDS infrastructure 560 that is associated with the transactional service 510 may include a transactional provider contract 516 (e.g., defining view entity ViewName provider contract for a transactional_query).

Similarly, the CDS entity 524 in the CDS infrastructure 560 that is associated with the SQL service 520 may include a SQL provider contract 526 (e.g., defining view entity ViewName provider contract for a SQL_query). Likewise, the CDS entity 534 that is associated with the analytical service 530 may include an analytical provider contract 536 (e.g., defining view entity ViewName provider contract for an analytical_query), and the CDS entity 544 that is associated with the search service 540 may include a search provider contract 546 (e.g., defining view entity ViewName provider contract for a search_query).

As used herein, the phrase "provider contract" may be associated with, for example, a scenario in which a CDS projection view is used. The scenario may determine in which runtime a CDS projection view is executed and which features are available. Specifying the provider contract may help ensure that the appropriate, runtime-specific syntax checks are applied.

In this way, embodiments may specifically model a CDS entity 514, 524, 534, 544 for a particular runtime 512, 522, 532, 542 inside the ABAP server 550. This feature may enable, for example:
  additional checks during compilation of the design time artifact of a CDS entity 514, 524, 534, 544;
  detailed hints and auto-completions for editors;
  fine-grained release checks of specific CDS entities 514, 524, 534, 544 (relevant for extensibility scenarios); and
  introduction of new features inside the core CDS infrastructure 560 (even if it is not SQL based).
This may result in a reduction of the Total Costs of Development ("TCD"). Further, runtimes inside the ABAP server 550 can rely on such provider contracts 516, 526, 536, 546, which may result in:
  no runtime abortion for unsupported features anymore (already shown in the design time development of CDS entities 514, 524, 534, 544); and
  no sanity checks needed anymore by the corresponding runtimes 512, 522, 532, 542 (which can cause a reduction of TCD and faster runtimes).

In the past, runtime specific checks during compile time have not been possible in the CDS infrastructure 560. Therefore, successful compilation of a runtime specific CDS artifacts could not be prevented. This could result in runtime errors in target test systems. A time and cost intensive iterative development process (in both the development and test system) was required. According to some embodiments, provider contracts 516, 526, 536, 546 will support runtime specific checks during compile time, and therefore allow development of runtime specific CDS artifacts in the development system only.

Figure 6:
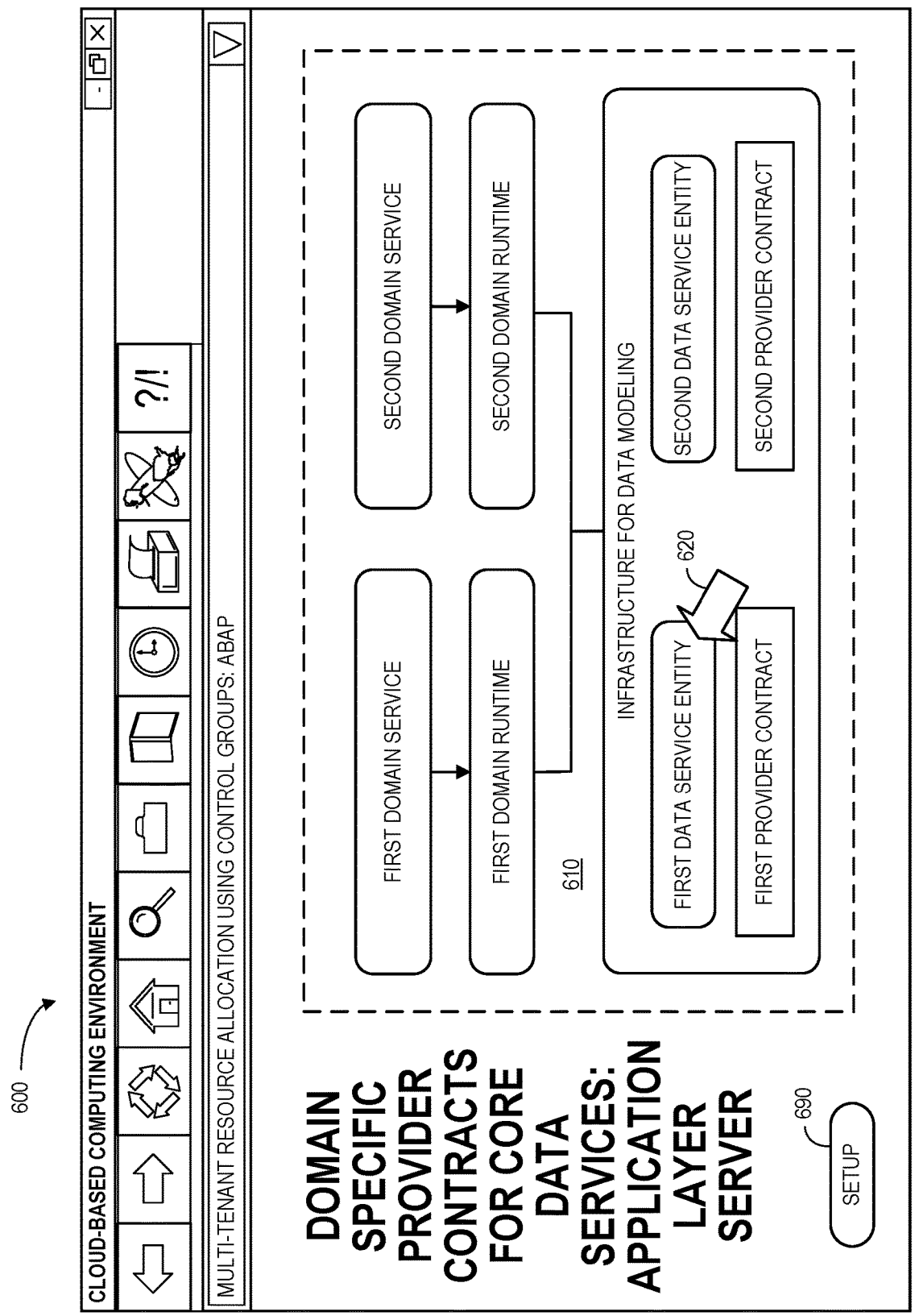
FIG. 6 is a human machine interface display in accordance with some embodiments.

FIG. 6 is a human machine interface display 600 associated with an ABAP server runtime in accordance with some embodiments. The display 600 includes a graphical representation 610 of elements of a cloud-based computing environment system. Selection of an element (e.g., via a touchscreen or computer pointer 620) may result in display of a pop-up window containing various options (e.g., to adjust mappings, add or delete domains, define provider contracts, etc.). The display 600 may also include a user-selectable "Setup" icon 690 (e.g., to configure parameters for cloud management, runtimes, and/or or CDS as described with respect any of the embodiments of FIGS. 2 through 5).

Figure 7:
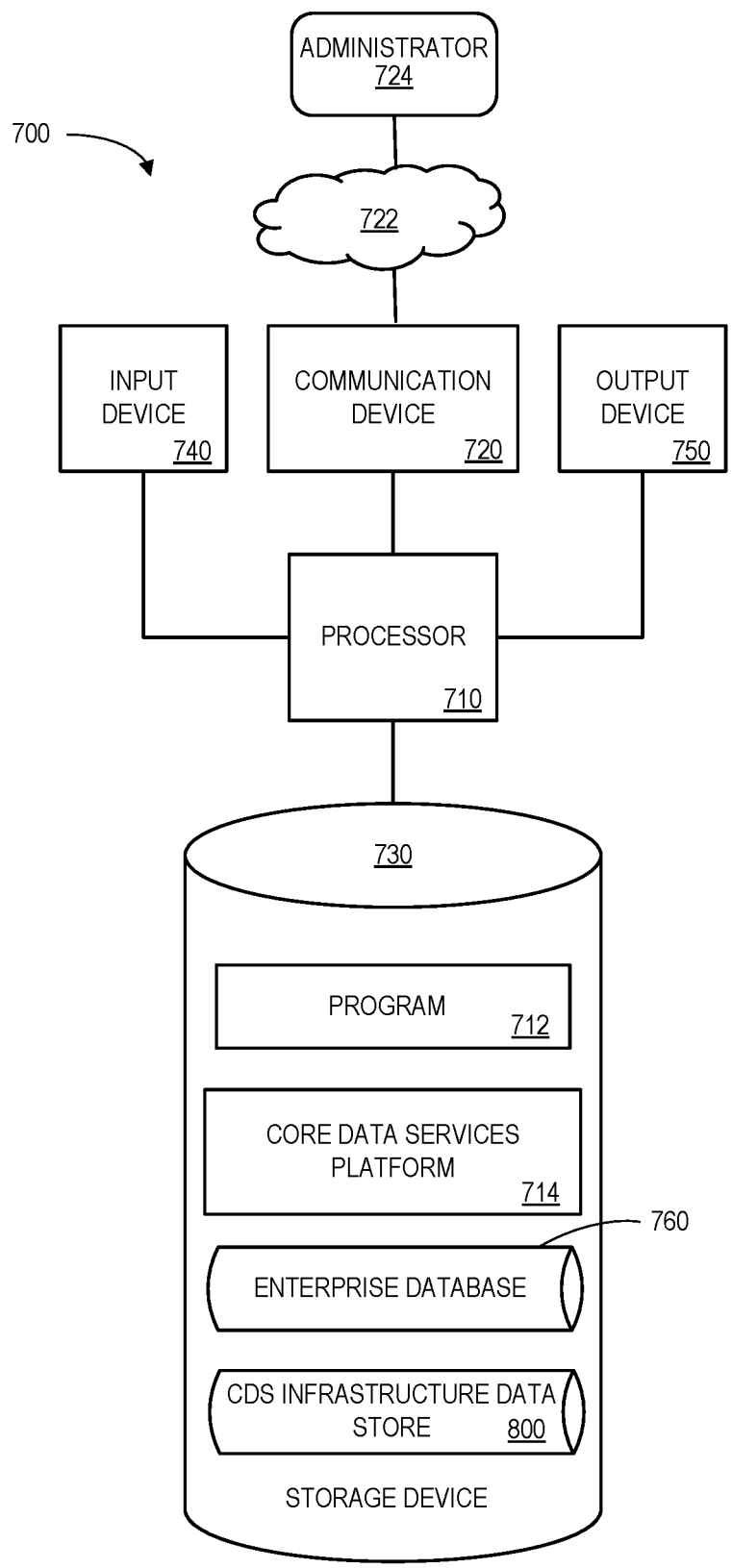
FIG. 7 is an apparatus or platform according to some embodiments.

Note that the embodiments described herein may be implemented using any number of different hardware configurations. For example, FIG. 7 is a block diagram of an apparatus or platform 700 that may be, for example, associated with the system 200 of FIG. 2 (and/or any other system described herein). The platform 700 comprises a processor 710, such as one or more commercially available Central Processing Units ("CPUs") in the form of one-chip microprocessors, coupled to a communication device 720 configured to communicate via a communication device 720. The communication device 720 may be used to communicate, for example, with one or more remote user or administrator 724 devices via a communication network 722. The platform 700 further includes an input device 740 (e.g., a computer mouse and/or keyboard to input provider contract details) and/an output device 750 (e.g., a computer monitor to render a display, transmit recommendations, and/or create data center reports). According to some embodiments, a mobile device and/or PC may be used to exchange information with the platform 700.

The processor 710 also communicates with a storage device 730. The storage device 730 can be implemented as a single database or the different components of the storage device 730 can be distributed using multiple databases (that is, different deployment information storage options are possible). The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or CDS platform 714 for controlling the processor 710. The processor 710 performs instructions of the programs 712, 714, and thereby operates in accordance with any of the embodiments described herein. For example, the processor 710 may access an enterprise database 760 that stores enterprise information. The processor 710 may use an application programming language (e.g., ABAP) to access the enterprise information. The processor 710 may execute a plurality of domain runtimes, each associated with a domain service (e.g., transactional, SQL, analytical, search, etc.). The processor 710 may also access, by a first domain runtime, a first data service entity via the CDS platform 714 that enables data models to be defined and consumed on the enterprise database server. Similarly, the processor 710 may access, by a second domain runtime, a second data service entity in the CDS platform 714. According to some embodiments, the first data service entity includes a first provider contract and the second data service entity includes a second provider contract (different than the first provider contract).

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores the enterprise database 760 and a CDS infrastructure data store 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 illustrates a CDS infrastructure database in accordance with some embodiments.

Referring to FIG. 8, a table is shown that represents the CDS infrastructure data store 800 that may be stored at the platform 700 according to some embodiments. The table may include, for example, entries that define provider contracts for various domains. The table may also define fields 802, 804, 806, 808, for each of the entries. The fields 802, 804, 806, 808 may, according to some embodiments, specify: a domain identifier 802, a description 804, runtime and CDS entity identifiers 806, and a provider contract identifier 808. The CDS infrastructure data store 800 may be created and updated, for example, when a new domain is added or deleted, an existing domain is adjusted, etc. According to some embodiments, the CDS infrastructure data store 800 may further store details about an enterprise database server.

The domain identifier 802 might be a unique alphanumeric label or link that is associated with a service supported by an application layer server. The description 804 might describe the service associated with that domain (e.g., transactional, SQL, analytical, search, etc.). The runtime and CDS entity identifiers 806 may define a service runtime and CDS entity for the domain associated with the domain identifier 802. The provider contract identifier 808 may comprise a domain specific provider contract in accordance with any of the embodiments described herein (e.g., defining view entity ViewName provider contract for a query).

Thus, embodiments may provide CDS entity modeling for a particular runtime associated with a cloud-based computing environment application layer server in an efficient and accurate manner. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
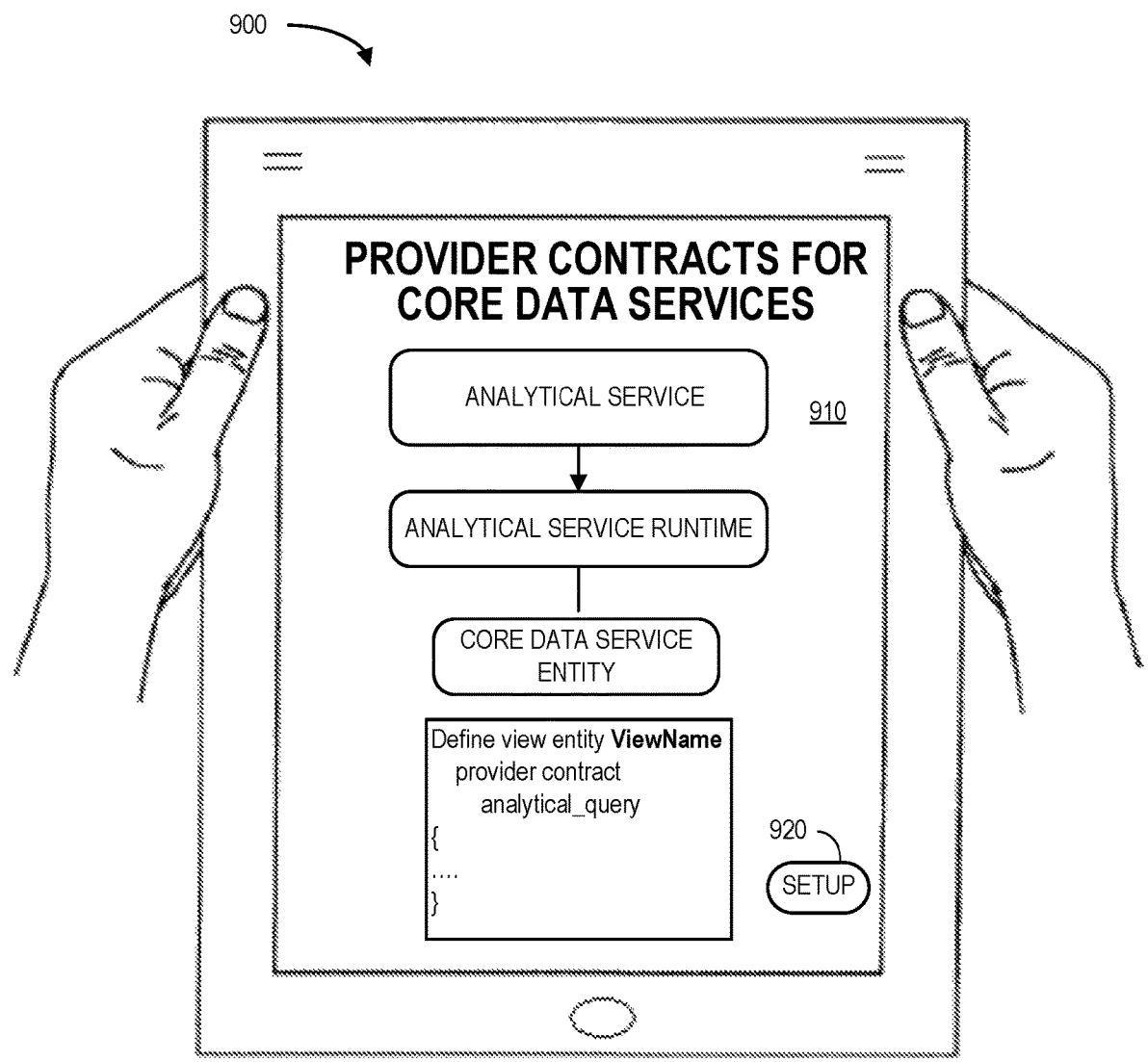
FIG. 9 illustrates a tablet computer displaying information about provider contracts according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database applications and services, any of the embodiments described herein could be applied to other types of applications and services. In addition, the displays shown herein are provided only as examples, and any other type of user interface could be implemented. For example, FIG. 9 shows a tablet computer 900 rendering information about provider contracts 910. The information about provider contracts 910 may, according to some embodiments, be used to view more detailed elements about components of the system (e.g., when a graphical element is selected via a touchscreen) or to configure operation of the system (e.g., to establish new mappings or domains for the system via a "Setup" icon 920).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:
   an enterprise database server storing enterprise information; and
   an application layer server, coupled to the enterprise database server, that uses an application programming language to access the enterprise information, including:
      at least one computer processor, and
      a memory storage device including instructions that, when executed by the at least one computer processor, enable the application layer server to:
         execute a plurality of domain runtimes, each associated with a domain service,
         access, by a first domain runtime, a transactional service entity in a Core Data Services ("CDS") infrastructure for data modelling that enables data models to be defined and consumed on the enterprise database server rather than the application layer server,
         access, by a second domain runtime, a Structured Query Language ("SQL") service entity in the CDS infrastructure for data modelling,
         access, by a third domain runtime, an analytical service entity in the CDS infrastructure for data modelling, and
         access, by a fourth domain runtime, a search service entity in the CDS infrastructure for data modelling,
         wherein the transactional, SQL, analytical, and search service entities each include a different provider contract enabling: additional checks during compilation of a design time artifact of a CDS entity; detailed hints and auto-completions for an editor; no run time halts for unsupported features; and no run time sanity check.

2. The system of claim 1, wherein the application programming language is associated with Advanced Business Application Programming ("ABAP").

3. The system of claim 2, wherein each provider contract enables fine-grained release checks for specific CDS entities.

4. The system of claim 3, wherein each provider contract enables an introduction of new features inside the CDS infrastructure.

5. A computer-implemented method associated with a cloud-based computing environment, comprising:
  executing, by at least one computer processor of an application layer server that uses an application programming language to access enterprise information, a plurality of domain runtimes, each associated with a domain service;
  accessing, by a first domain runtime, a transactional service entity in a Core Data Services ("CDS") infrastructure for data modelling that enables data models to be defined and consumed on an enterprise database server rather than the application layer server, wherein the enterprise database server stores the enterprise information;
  accessing, by a second domain runtime, a Structured Query Language ("SQL") service entity in the CDS infrastructure for data modelling;
  accessing, by a third domain runtime, an analytical service entity in the CDS infrastructure for data modelling; and
  accessing, by a fourth domain runtime, a search service entity in the CDS infrastructure for data modelling,
  wherein the transactional, SQL, analytical, and search service entities each include a different provider contract enabling: additional checks during compilation of a design time artifact of a CDS entity; detailed hints and auto-completions for an editor; no run time halts for unsupported features; and no run time sanity check.

6. The method of claim 5, wherein the application programming language is associated with Advanced Business Application Programming ("ABAP").

7. A non-transitory, computer-readable medium storing instructions, that, when executed by a processor, cause the processor to perform a method associated with a cloud computing environment, the method comprising:
  executing, by at least one computer processor of an application layer server that uses an application programming language to access enterprise information, a plurality of domain runtimes, each associated with a domain service;
  accessing, by a first domain runtime, a transactional service entity in a Core Data Services ("CDS") infrastructure for data modelling that enables data models to be defined and consumed on an enterprise database server rather than the application layer server, wherein the enterprise database server stores the enterprise information;
  accessing, by a second domain runtime, a Structured Query Language ("SQL") service entity in the CDS infrastructure for data modelling;
  accessing, by a third domain runtime, an analytical service entity in the CDS infrastructure for data modelling; and
  accessing, by a fourth domain runtime, a search service entity in the CDS infrastructure for data modelling,
  wherein the transactional, SQL, analytical, and search service entities each include a different provider contract enabling: additional checks during compilation of a design time artifact of a CDS entity; detailed hints and auto-completions for an editor; no run time halts for unsupported features; and no run time sanity check.

8. The medium of claim 7, wherein the application programming language is associated with Advanced Business Application Programming ("ABAP").

9. The medium of claim 7, wherein each provider contract enables fine-grained release checks for specific CDS entities.

10. The medium of claim 9, wherein each provider contract enables an introduction of new features inside the CDS infrastructure.

* * * * *